June 12, 1951 H. G. MAERLENDER 2,556,764
LOCK NUT
Filed April 21, 1947

INVENTOR.
H. G. Maerlender
BY Robb & Robb
Attorneys

Patented June 12, 1951

2,556,764

UNITED STATES PATENT OFFICE 2,556,764

LOCK NUT

Henry G. Maerlender, Cleveland, Ohio

Application April 21, 1947, Serial No. 742,884

4 Claims. (Cl. 151—25)

My present invention comprises an improved construction of locknut involving the provision of novel locking means associated with the nut body and adapted to engage the threads on a screw bolt for providing the desired locking action for the nut.

In accordance with my invention, I provide a nut structure wherein the nut body is formed with a recess in which is disposed a locking member of novel form suitably retained in said recess and having a part arranged to project very slightly from the inner peripheral portion of the bolt receiving opening of the nut, and normally spring pressed to a position substantially tangential to threaded portion of the bolt into contact with the periphery of the bolt thread. As disclosed herein, the aforesaid recess in the nut body is formed by cutting away a portion of the nut body interiorally thereof to form a recess extending annularly around the bolt receiving opening of the nut from a point intermediate the opposite axial ends of the nut outwardly to one of said ends; and the novel locking member of my invention comprises essentially a band of spring metal normally assuming a substantially circular configuration and adapted to lie in said recess in the spring engagement with the outer wall thereof, a portion of said spring metal band adjacent to one of the free ends thereof being normally disposed to curve radially inwardly to form a projection or point projecting slightly radially inwardly of the periphery of the bolt opening of the nut, the adjacent free end of said spring metal band extending from said projecting point substantially tangential to the periphery of said bolt opening of the nut and engaging the outer wall of said recess in anchored condition in abutment with the opposite end of spring metal band.

The arrangement of the projecting portion of the said spring metal band is such as to cause it to contact the threaded portion of the bolt when the nut is screwed thereon to permit free rotation of the nut and bolt by a yielding action of the metal band but when the nut is attempted to be unscrewed from the belt the projection will engage the threaded portion of the bolt with a locking action due to the arrangement of the adjacent free end of the metal band and its anchored condition preventing yielding action when pressure is applied thereto by reverse rotation of the nut.

Another feature of my invention resides in the construction of the locking element permitting release of the locking relation by manipulation thereof.

A further object of my invention has been to provide a lock nut structure of simple and efficient design which may be manufactured relatively inexpensively.

For a full understanding of my invention, the same will now be described in detail in connection with the drawings annexed hereto, in which.

Figure 1:
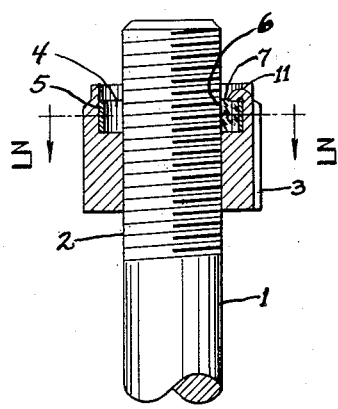
Figure 1 is a view in side elevation and partly in section showing a lock nut embodying my invention mounted upon a common form of screw bolt, the section being taken substantially on the line 1—1 of Figure 4.
Figure 2:
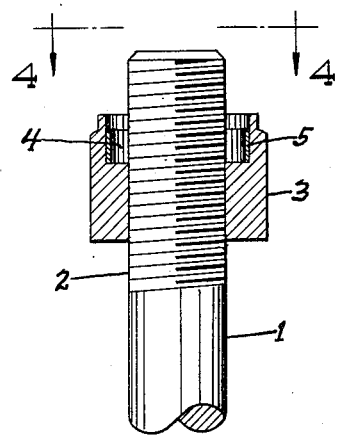
Figure 2 is a view similar to Figure 1, the section being taken substantially on the line 2—2 of Figure 4.

In the drawings the numeral 1 indicates an ordinary form of screw bolt having the threaded portion 2 and a head portion (not shown) at the opposite end thereof.

The threaded portion 2 of the bolt is adapted to receive the lock nut 3 which may be of hexagonal form as shown, the body of the nut 3 having a portion cut away interiorally thereof to provide a recess 4 extending annularly around the usual bolt receiving opening of the nut, said bolt receiving opening being interiorally threaded as usual for cooperation with the threaded portion 2 of the bolt 1. The recess 4 extends from a point intermediate the opposite axial ends thereof axially outward to one of said ends.

Figure 3:
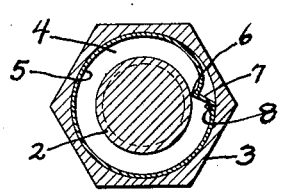
Figure 3 is a sectional view taken on the line 3—3 of Figure 1.
Figure 4:
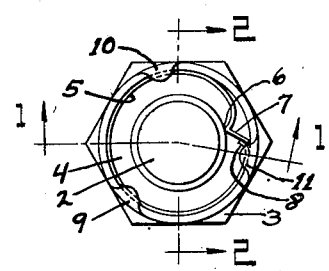
Figure 4 is a top plan view taken on the line 4—4 of Figure 2.

Within the recess 4 is disposed a separate locking member 5 which as illustrated comprises a band of spring metal normally assuming the substantially circular configuration as shown in Figures 3 and 4 spring pressed into engagement with the outer wall of the recess 4.

The spring metal band 5 has a portion adjacent to one of its free ends curved radially inwardly to provide a projection or point 6 normally projecting radially inwardly of the periphery of the bolt receiving opening of the nut 3, under spring action of the locking element 5 in its condition as disposed in the recess 4.

The free end portion 7 of the locking member 5 extends from the projection 6 in a straight line substantially tangential to the circular periphery of the bolt receiving opening of the nut 3, said free end portion 7 of the locking member 5 being anchored by abutment with the outer wall of the recess 4 and with the curved opposite end 8 of the spring metal locking band 5.

For retaining the locking member 5 in the recess 4, the body of the nut 3 may be crimped over as indicated at 9, 10 and 11 at the outer end of the nut body. Preferably one of the crimped portions such as 11 is crimped in behind the curve of the curved end 8 of the spring metal band 5 to maintain the latter in an anchored position for more firmly holding the end 7 in anchored position in abutment therewith.

From the foregoing it will be understood that when the nut 3 is screwed on to the bolt 1, the projection or point 6 which normally projects radially inwardly of the nut body beyond the periphery of the bolt receiving opening thereof is caused to resiliently engage the periphery of the thread of the bolt 1 in a manner such that the turning movement of screwing the nut 3 upon the bolt 1 is not resisted due to the fact that the straight free end portion 7 of the lock element 5 extends tangentially to the thread of the bolt and the turning movement of screwing the nut 3 upon the bolt 1 simply causes yielding outward movement of that part of the locking element 5 including the projection 6. However reverse rotation of the nut 3 relative to the bolt 1 (i. e. counterclockwise rotation of the nut 3 relative to the bolt 1, referring to the Figures 3 and 4) causes the projection 6 to dig into the metal of the periphery of the threaded portion 2 of the bolt 1, the pressure of such reverse turning movement of the nut 3 relative to the bolt 1 being transmitted to the portion 7 of the locking element 5 in a straight line direction from the projection 6 to the wall recess 4 against which the extreme edge of the portion 7 is anchored by abutment with the opposite curved end 8 of the locking element 5, and under the latter condition this portion of the locking element 5 does not yield outwardly but positively resists the reverse turning movement of the nut 3 relative to the bolt 1.

When it is desired to free the locking relation between the nut 3 and the bolt 1 to permit reverse rotation of the nut 3 to remove the same from the bolt 1, it will be seen that the structure permits the insertion of a tool such as a screw driver or the like into the recess 4 from the lower side (referring to Figures 3 and 4) of the end portion 7 of the locking member 5, and by pushing the tool against the portion 7 of the locking member when so inserted, the point or projection 6 may be moved outwardly radially against the spring action of the member 5 to disengage the projection 6 from locking engagement with the threaded portion 2 of the bolt 1 whereby to permit removal of the nut 3 therefrom.

Having thus described my invention, what I claim as new and desire to secure by Letters Patent of the United States, is:

1. A lock nut comprising, in combination, a nut body having the usual threaded opening therein, and a locking member comprising a spring band having a V-shaped projecting portion at one end normally projecting slightly inwardly of the periphery inwardly of said opening, the other end portion of the band being bent, the end portions of such band being disposed in abutting relation, the nut body having a recess in its outer end in which the band is received and against the outer periphery of which the band resiliently engages.

2. A lock nut comprising, in combination, a nut body having the usual threaded opening therein and having an annular recess therein extending around said opening and substantially entirely open in an axial direction, and a locking member comprising a spring band of substantially circular configuration disposed in said recess in yielding engagement with the outer wall thereof, said band having a projecting portion normally resiliently pressed to project slightly inwardly of the periphery inwardly of said opening and a nut gripping portion of said band extending from said projecting portion substantially tangential to the periphery of said threaded opening, the end portion of said band being disposed in abutting relation, and the outer ends of the walls of said recess having projections overlying and preventing displacement of said band.

3. A lock nut comprising, in combination, a nut body having the usual threaded opening therein and having an annular recess therein extending around said opening and substantially entirely open in an axial direction, and a locking member comprising a spring band of substantially circular configuration disposed in said recess in yielding engagement with the outer wall thereof, said band having a projecting portion normally resiliently pressed to project slightly inwardly of the periphery inwardly of said opening and a nut gripping portion of said band extending from said projecting portion substantially tangential to the periphery of said threaded opening, the end portions of said band being disposed in abutting relation, and anchoring means for anchoring said band near one end in fixed position comprising a part of the nut crimped over to engage one of the free ends of the band.

4. A lock nut comprising, in combination a nut body having the usual threaded opening therein and having an annular recess therein extending around said opening, and a locking member comprising a spring band of substantially circular configuration disposed in said recess in yielding engagement with the outer wall thereof, said band having a portion curved radially inwardly to provide a projecting portion normally resiliently pressed to project slightly inwardly of the periphery inwardly of said opening and a nut gripping portion of said band extending from said projecting portion substantially tangential to the periphery of said threaded opening, the end portions of said band being disposed in abutting relation, and anchoring means for anchoring said band near one end in fixed position including portions of the nut at its outer end bent to engage at one point one of the free ends of the band and at other points to extend over the band to prevent its displacement from said recess.

HENRY G. MAERLENDER.

REFERENCES CITED

The following references are of record in the file of this patent:

UNITED STATES PATENTS

| Number | Name | Date |
|---|---|---|
| 589,599 | Hardy | Sept. 7, 1897 |
| 781,954 | King et al. | Feb. 7, 1905 |
| 1,407,570 | Peirce | Feb. 21, 1922 |
| 2,367,929 | Colman | Jan. 23, 1945 |